United States Patent
Guday et al.

(10) Patent No.: US 10,728,872 B1
(45) Date of Patent: Jul. 28, 2020

(54) LEVERAGING INFRASTRUCTURE AND CLIENT BASED LOCATION INFORMATION IN A HYBRID POSITIONING MODEL

(71) Applicant: Microsoft Technology Licensing, LLC, Redmond, WA (US)

(72) Inventors: Shai Guday, Redmond, WA (US); Priyanka Bhargavi Vegesna, Redmond, WA (US); Daniel Hwang, Newcastle, WA (US); Dhanya Krishnan Nair, Redmond, WA (US); John Sukkar, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/287,971

(22) Filed: Feb. 27, 2019

(51) Int. Cl.
*H04W 64/00* (2009.01)

(52) U.S. Cl.
CPC .................. *H04W 64/00* (2013.01)

(58) Field of Classification Search
CPC .... H04W 64/00; H04W 64/003; H04W 68/00
See application file for complete search history.

(56) References Cited

U.S. PATENT DOCUMENTS

| | | | |
|---|---|---|---|
| 8,552,881 B2 * | 10/2013 | Nylund | H04W 4/029 340/686.1 |
| 2013/0317778 A1 * | 11/2013 | Gupta | G01S 5/0036 702/150 |
| 2014/0256356 A1 | 9/2014 | Shen et al. | |
| 2015/0153191 A1 * | 6/2015 | Ma | G01C 21/34 701/426 |
| 2017/0219680 A1 | 8/2017 | Un et al. | |
| 2017/0238136 A1 * | 8/2017 | Smith | H04W 4/029 455/456.3 |
| 2019/0195996 A1 * | 6/2019 | Ding | H04W 24/10 |
| 2019/0246349 A1 * | 8/2019 | Xing | H04W 64/00 |

OTHER PUBLICATIONS

Wi-Fi Alliance, "Wi-Fi Certified Location™: Indoor Location over Wi-Fi®", Feb. 2017, 8 pages.
Wi-Fi Alliance, "Wi-Fi Certified Location™ Orientation", Nov. 2017, 56 pages.

* cited by examiner

*Primary Examiner* — Marisol Figueroa
(74) *Attorney, Agent, or Firm* — Rainier Patents, P.S.

(57) ABSTRACT

Described herein is a system and method leveraging infrastructure and client based location information in a hybrid positioning model. Location information can be received from a client device by a geospatial service component. For example, the location information can be calculated using fine time measurement (FTM) of IEEE 802.11mc and an access point. Positioning information can be determined based, at least in part, upon the received location information. The positioning information can include information regarding a physical environment of the client device. The positioning information can be provided to the client device.

20 Claims, 7 Drawing Sheets

LEVERAGING INFRASTRUCTURE AND CLIENT BASED LOCATION INFORMATION IN A HYBRID POSITIONING MODEL

BACKGROUND

Users frequently utilize their devices, such as mobile phones, tablets, laptops etc. indoors. While GPS may provide adequate information regarding location of mobile devices outdoors, GPS generally is not adequate indoors. Additionally, many devices are equipped with Wi-Fi communication capability but not cellular communication and/or GPS capabilities.

SUMMARY

Described herein is a hybrid positioning model system, comprising: a computer comprising a processor and a memory having computer-executable instructions stored thereupon which, when executed by the processor, cause the computer to: receive location information from a client device, wherein the location information is calculated using fine time measurement (FTM) of IEEE 802.11mc and an access point; determine positioning information based, at least in part, upon the received location information; and provide the positioning information to the client device.

Further described herein is a method of providing positioning information, comprising: calculating location information of a client device using fine time measurement (FTM) and an access point; providing the calculated location information to a geospatial component; and receiving positioning information regarding a physical environment of the client device from the geospatial component.

Also described herein is a computer storage media storing computer-readable instructions that when executed cause a computing device to: receive location information from a client device, wherein the location information is calculated by the client device using fine time measurement and an access point; determine positioning information based, at least in part, upon the received location information; and provide the positioning information to the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
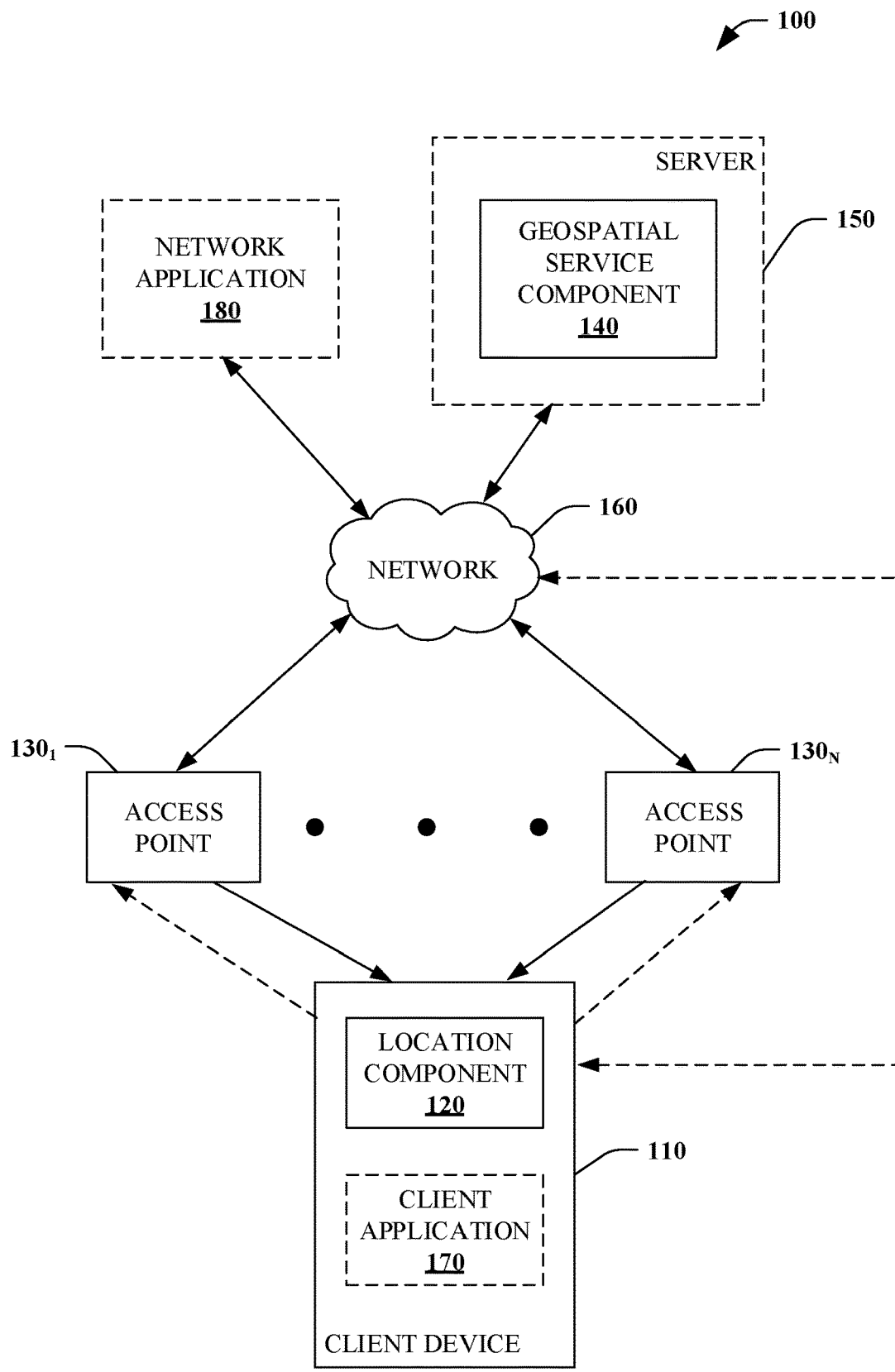
FIG. 1 is a functional block diagram that illustrates a hybrid positioning model system.

Various technologies pertaining to leveraging infrastructure and client based location information in a hybrid positioning model are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding leveraging infrastructure and client based location information in a hybrid positioning model. What follows are one or more exemplary systems and methods.

Aspects of the subject disclosure pertain to the technical problem of providing positioning information to a client device. The technical features associated with addressing this problem involve receiving location information from a client device, the location information can be calculated using fine time measurement (FTM) of IEEE 802.11mc and an access point; determining positioning information based, at least in part, upon the received location information; and providing the positioning information to the client device. Accordingly, aspects of these technical features exhibit technical effects of more efficiently and effectively providing positioning information to a client device, for example, reducing computational resource consumption on client device(s) and/or communication bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

As used herein, "client device" refers to a computer or computing device (e.g., a desktop, a server, a hand-held, programmable consumer or industrial electronics, a set-top box, a game system, a compute node, a mobile phone, a watch, a laptop, a tablet, a phablet, a personal digital assistant (PDA), an e-reader, a wearable computer, a head-mounted display (HMD)).

In general, determining a location of a client device can be performed by the client device or by a component (e.g., service) accessible to the client device via a network to which the client device is connected. In some embodiments, determining the location can be based upon Wi-Fi technology, for example, 802.11, 802.11mc, and/or cellular technology. Client-based localization model(s) can locally compute location on the client device which is then available (e.g., immediately) to be leveraged in experiences on the client device or local experience. Infrastructure-based models compute the location of the client device using infrastructure device(s)/information (e.g., Wi-Fi access point(s), cell tower trilateration, reverse IP) and the client may be unaware that its location has been computed.

The system and method described herein employ a hybrid architecture combining the client-based localization model with the infrastructure-based model. The hybrid architecture can leverage a combined geospatial service which can provide significant additional value for solution provider(s) that traditionally fall into either infrastructure solution(s) or client solution(s).

For purposes of explanation and not limitation, the client-based localization model is explained in the context of 802.11mc. However, the hybrid architecture described herein can utilize other client-based localization models such as other Wi-Fi technology (e.g., 802.11az), Bluetooth®, radio frequency identification (RFID), cellular technology (e.g., 3G, 4G, 4G LTE, 5G, etc.) and/or millimeter wave technology to determine geospatial information of a client device.

In some embodiments, the system and method can be utilized to provide location information to users located indoors (e.g., inside of a building). In some embodiments, the system and method can be utilized to provide and/or augment GPS location information (where location information comprises rough general coordinates) to users located outdoors (e.g., inside of an urban canyon).

Referring to FIG. 1, a hybrid positioning model system 100 is illustrated. The system 100 utilizes a hybrid architecture combining a client-based localization model with an infrastructure-based model to determine positioning information. The system 100 includes one or more client devices 110, each client device 110 having a location component 120. In some embodiments, the location component 120 can determine geospatial information associated with the client device 110.

In some embodiments, the client device 110 is communicatively coupled to one or more access points 130. In some embodiments, the client device 110 is not communicatively coupled to any of the access points 130 but communicatively coupled to a geospatial services component 140 using another communication modality. For example, the client device 110 can be communicatively coupled to the geospatial services component 140 using a wired network connection (e.g., Ethernet connection) and/or a wireless network connection (e.g., cellular connection such as 3G, 4G, 4G LTE, 5G, etc.).

In some embodiments, the location component 120 determines the geospatial information (e.g., three-dimensional location of the client device 110) in accordance with information provided by one or more access points 130. Client-based localization model(s) can locally compute location on the client device 110 which can then be available to be leveraged in location-based experience(s) on the client device 110.

In some embodiments, the information is provided by the one or more access points 130 with or without the client device 110 connecting to the access points 130. For example, in accordance with IEEE 802.11mc, a particular access point 130 can broadcast location information regarding the particular access point 130. That is, the access point 130 broadcasts this location information (e.g., periodically and/or in response to a request) to any client device 110 within broadcast range.

When in proximity of the particular access point 130 to receive the broadcasted location, the client device 110 can utilize this broadcast location information along with fine timing measurement (FTM) to determine a location of the client device 110. FTM allows the client device 110 to approximate the distance to a particular access point 130 based upon the time it takes for a signal to travel between the client device 110 and the particular access point 130. In some embodiments, the client device 110 can utilize location information broadcasted from a plurality of access points 130 (e.g., at least three) to calculate the location of the client device 110 using trilateration.

In some embodiments, the location component 120 determines geospatial information associated with the client device 110 by wirelessly connecting to one or more access points 130. Once connected to the access points 130, the location component 120 can utilize one or more technologies (e.g., non-FTM) to determine the geospatial information.

In some embodiments, the location component 120 can utilize received signal strength indicator (RSSI) and multi-lateration techniques to determine the geospatial information (e.g., geospatial location) of the client device 110. In some embodiments, the location component 120 can utilize a RSSI-based fingerprinting technique to determine the geospatial information of the client device 110. In some embodiments, the location component 120 can utilize an angle of arrival based technique to determine the geospatial information of the client device 110. In some embodiments, the location component 120 can utilize a time of flight based technique to determine the geospatial information of the client device 110. In some embodiments, the location component 120 can utilize an angle of departure based technique to determine the geospatial information of the client device 110. In some embodiments, the location component 120 determines geospatial information associated with the client device 110 by using Bluetooth® beacon(s), radio frequency identification (RFID), cellular technology (e.g., 3G, 4G, 4G LTE, 5G, etc.) and/or millimeter wave technology. In some embodiments, the location component 120 can utilize some or all of these techniques (e.g., RSSI and multi-lateration, RSSI-based fingerprinting, angle of arrival based, time of flight based, angle of departure based, Bluetooth® beacon(s), radio frequency identification (RFID), cellular technology (e.g., 3G, 4G, 4G LTE, 5G, etc.) and/or millimeter wave technology) to determine geospatial information associated with the client device 110.

In some embodiments, the location component 120 can utilize one or more other FTM capable responder(s) (e.g., other client device(s) 110) that know and are ready to share their location information. In some embodiments, the location information obtained from the other FTM capable responder(s) can be utilized in conjunction with the FTM performed by the client device 110 to determine a location of the client device 110. In some embodiments, the location information obtained from the other FTM capable response(s) is utilized by the client device 110 to determine the geospatial information of the client device 110 (e.g., without the client device 110 performing FTM of its own).

The system 100 further includes one or more access points 130 that provide signals and/or Wi-Fi access to the one or more client devices 110. In some embodiments, the access point 130 is based upon Wi-Fi technology such as IEEE 802.11 and/or IEEE 802.11mc. In some embodiments, at least some of the access points 130 are location aware. That is, a particular access point 130 has knowledge of the access point 130's physical location in three-dimensions (e.g., latitude, longitude, and altitude coordinates). The access point 130 can provide information regarding the access point 130's physical location in response to request for the information and/or by periodic broadcast. In some embodiments, one or more of the access points 130 can provide information including location information (e.g., geospatial information) of the access point(s) 130 and/or connected device(s) 110 to a geospatial services component 140.

The system 100 further includes the geospatial services component 140. In some embodiments, the geospatial services component 140 can be a component of a server 150. In some embodiments, the geospatial services component 140 can be a component of the client device 110. In some embodiments, the geospatial services component 140 can be a distributed component with a portion on the server 150 and a portion on the client device 110.

In some embodiments, the geospatial services component 140 can generate location information of the client device 110. The geospatial services component 140 can be communicatively connected to the one or more access points 130 via a network 160 (e.g., the Internet, a private network, a public network). In some embodiments, the geospatial services component 140 can be communicatively connected to the client device 110 via the access point(s) 130 and/or the network 160.

In some embodiments, the geospatial services component 140 can compute the location of the client device using infrastructure device(s)/information (e.g., Wi-Fi access point(s), cell tower trilateration, reverse IP) and the client may be unaware that its location has been computed. For non-FTM clients, the geospatial services component 140 can generate location information based upon information provided by one or more access points 130 (e.g., round trip time (RTT) and direction), cell tower trilateration, and/or reverse IP, and the like. In some embodiments, the location information may not immediately be available to the client device 110. For example, the client device 110 may be required to authenticate itself to the geospatial services component 140 or otherwise explicitly or implicitly request the generated location information about the particular client device 110. In some embodiments, the client device 110 can require the geospatial services component 140 in order to power location-based experience(s).

Based, at least in part, upon the location information regarding the client device 110, the geospatial services component 140 can determine and provide positioning information to the client device 110 and/or a network application 180. By way of explanation and not limitation, several scenarios regarding positioning information are set forth.

In some embodiments, the positioning information generated by the geospatial services component 140 can power location-based experience(s) on the client device 110. For example, a low latency client-based experiences, such as client application 170, can be informed by space utilization data provided by the geospatial services component 140 (e.g., without the client device 110 calculating or recalculating location information). In this manner, the client device 110 can utilize information provided by the geospatial services component 140 to conserve resource(s) (e.g., battery power, power consumption, processor utilization) of the client device 110.

In some embodiments, based upon location information of the client device 110, provided by the client device 110 and/or determined by the geospatial services component 140, the geospatial services component 140 can provide information to the client device 110 regarding the physical environment (e.g., building, campus) of the client device 110 (e.g., in proximity to the client device 110). For example, the geospatial services component 140 can determine that the client device 110 is located in a particular conference room of a building and provide information regarding the building to the client device 110.

In some embodiments, the geospatial services component 140 can facilitate locating another client device 110. For example, based upon the location information of a first client device 110 and a second client device 110, provided by the client devices 110 and/or determined by the geospatial services component 140, the geospatial services component 140 can provide information to the first client device 110 regarding the location of the second client device 110 (e.g., the second client device 110 is in conference room 11-B). Additionally and/or alternatively, the geospatial services component 140 can provide navigation information regarding the location of the second client device 110 relative to the location of the first client device 110 (e.g., map with navigation route). By providing location updates to the geospatial services component 140 while the first client device 110 is in transit, the geospatial services component 140 can provide updated navigation information regarding the relative location of the second client device 110. In some embodiments, while receiving location update(s) from the first client device 110 and/or the second client device, the geospatial services component 140 can provide updated navigation information provided to the first client device 110 to reflect the change in location(s) of the first client device 110 and/or the second client device 110.

In some embodiments, a network application 180 remote from the client device 110 (e.g., network application) can utilize information provided by the geospatial services component 140. In some embodiments, the geospatial services component 140 can store location information, temporal information (e.g., timestamp), and/or an identifier associated with particular client devices 110 (e.g., with explicit or implicit consent of a user associated with the particular client devices 110). This stored information can then be aggregated, filtered or otherwise manipulated by the network application 180 to provide positioning information to a user of the network application 180.

For example, the geospatial services component 140 can aggregate location information provided by a plurality of client devices 110 (e.g., at present and/or over a period of time). With knowledge of the current location of a plurality of client devices 110, the network application 180 can take appropriate action(s). For example, for a green building scenario, once a threshold number of client device(s) 110 are present in a particular location, the network application 180 can change setting(s) for an HVAC system. Likewise, once a threshold number of client device(s) 110 are removed from a particular location, the network application 180 can change setting(s) for the HVAC system.

In some embodiments, the aggregated location information can further be utilized by the network application 180 to facilitate resource demand (e.g., current, forecast future needs, store historical information). For example, in a retail store setting, as customers avail themselves of Wi-Fi in the retail store, the network application 180 can determine a current location of a plurality of client devices 110 (e.g., in a privacy-preserving manner), allowing the network application 180 to shift resources (e.g., sales assistants) in order to better assist customers.

Additionally, in some embodiments, the network application 180 can facilitate determination of traffic patterns associated with the plurality of client devices 110. For example, in a retail setting, the network application 180 can determine locations of the plurality of client devices 110 (e.g., in a privacy-preserving manner), allowing a user of the network application 180 to observe areas of the retail setting which have high traffic, low traffic, etc. along with when the traffic occurred. This can be useful in resource planning (e.g., sales assistants needed at particular locations and/or particular times) and/or product placement (e.g., particular area(s) of store being underutilized).

In some embodiments, the aggregated location information can be provided to the client device 110, for example, to identify crowded areas of buildings, factories, etc. In some embodiments, a dampening algorithm can be utilized to avoid harmonic oscillations which could result from providing the same information to a plurality of client devices 110. For example, Elevator A is busy use B, going out to all the client devices 110 in the building could make B overly busy and *A empty*.

FIGS. 2-6 illustrate exemplary methodologies relating to leveraging infrastructure and client based location information in a hybrid positioning model. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 2:
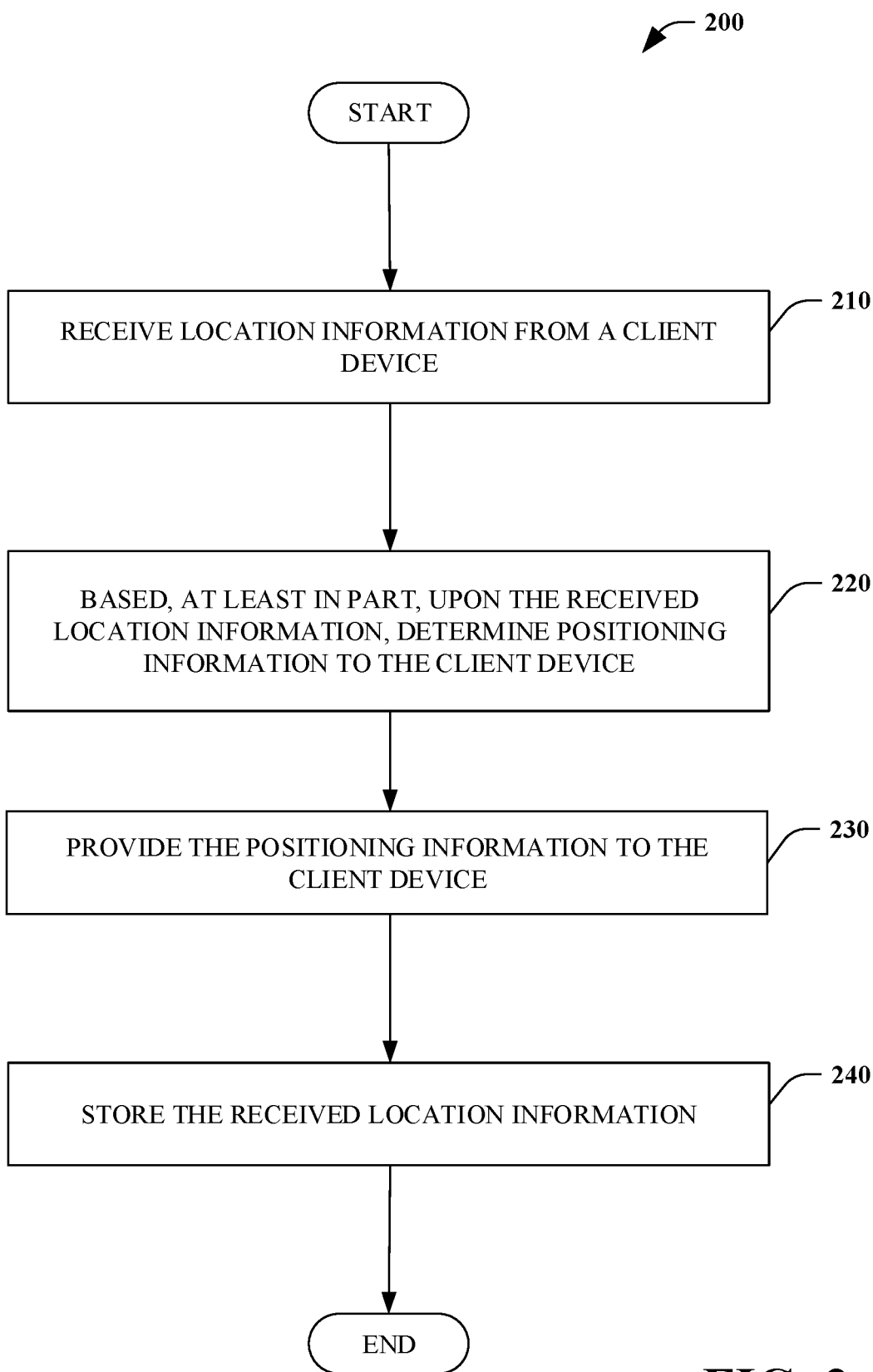
FIG. 2 is a flow chart of a method of providing positioning information.

Turning to FIG. 2, a method of providing positioning information 200 is illustrated. In some embodiments, the method 200 is performed by the geospatial service component 140.

At 210, location information is received from a client device. In some embodiments, the location information is calculated by the client device using IEEE 802.11mc fine timing measurement. In some embodiments, the location information is calculated by the client device using RSSI and a multi-lateration technique, an RSSI-based fingerprinting technique, an angle of arrival based technique, a time of flight based technique, and angle of departure based technique, a Bluetooth® beacon, RFID technology, cellular technology (e.g., 3G, 4G, 4G LTE, 5G, etc.) and/or millimeter wave technology to determine geospatial information of a client device.

At 220, positioning information is determined based, at least in part, upon the received location information. At 230, the positioning information is provided to the client device. At 240, the received location information is stored.

Figure 3:
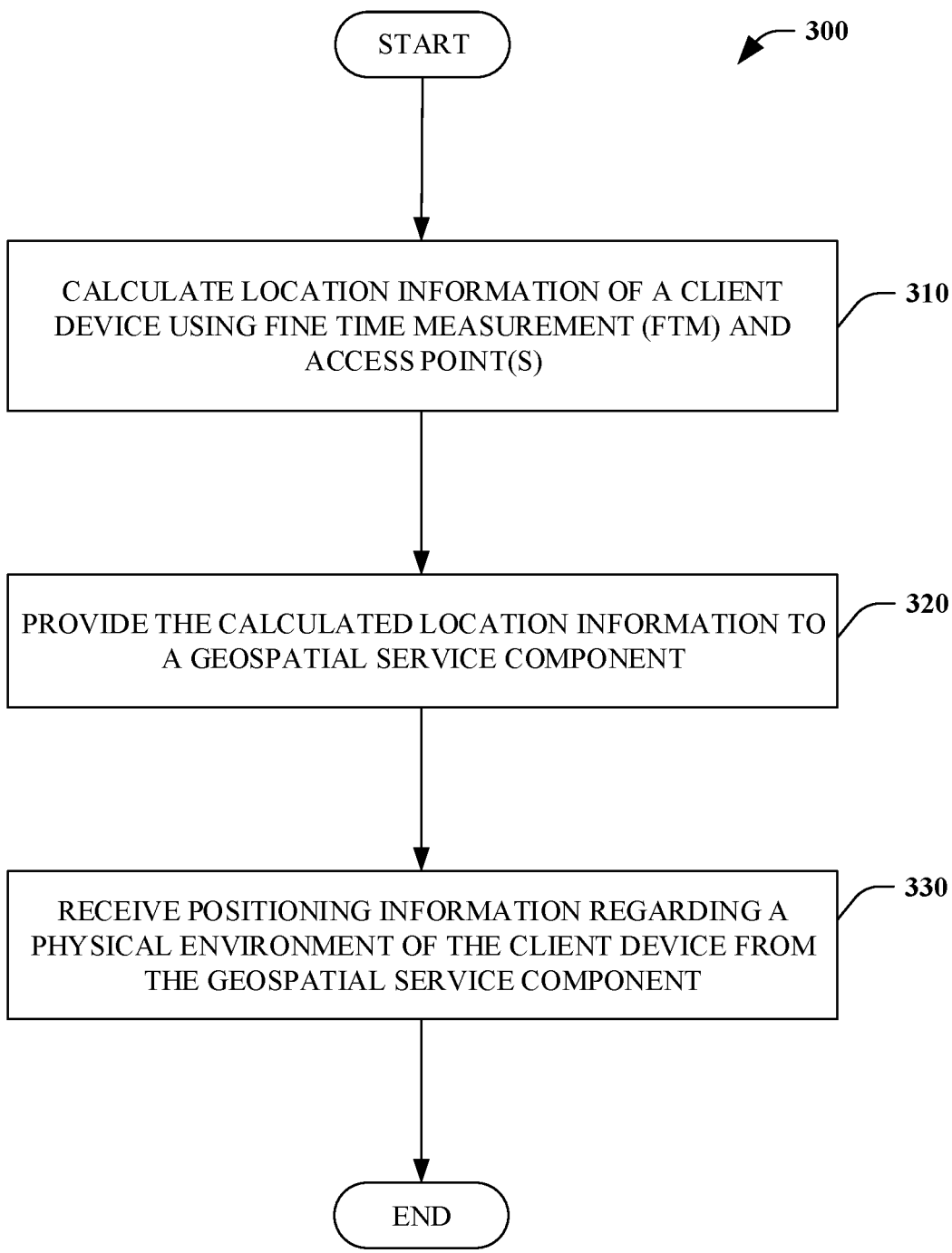
FIG. 3 is a flow chart of a method of utilizing positioning information.

Referring to FIG. 3, a method of utilizing positioning information 300 is illustrated. In some embodiments, the method 300 is performed by the client device 110.

At 310, location information of a client device is calculated using fine time measurement and access point(s). In some embodiments, the client device is connected to at least one of the access point(s). In some embodiments, the client device is not connected to the access point(s) but utilizes information broadcast by the access point(s).

At 320, the calculated location information is provided to a geospatial service component. In some embodiments, the calculated location information is provided using a wireless connection to one of the access point(s). In some embodiments, the calculated location information is provided using a wired network connection. In some embodiments, the calculated location information is provided using a wireless connection other than one of the access point(s) (e.g., cellular connection). At 330, positioning information regarding a physical environment of the client device is received from the geospatial service component.

Figure 4:
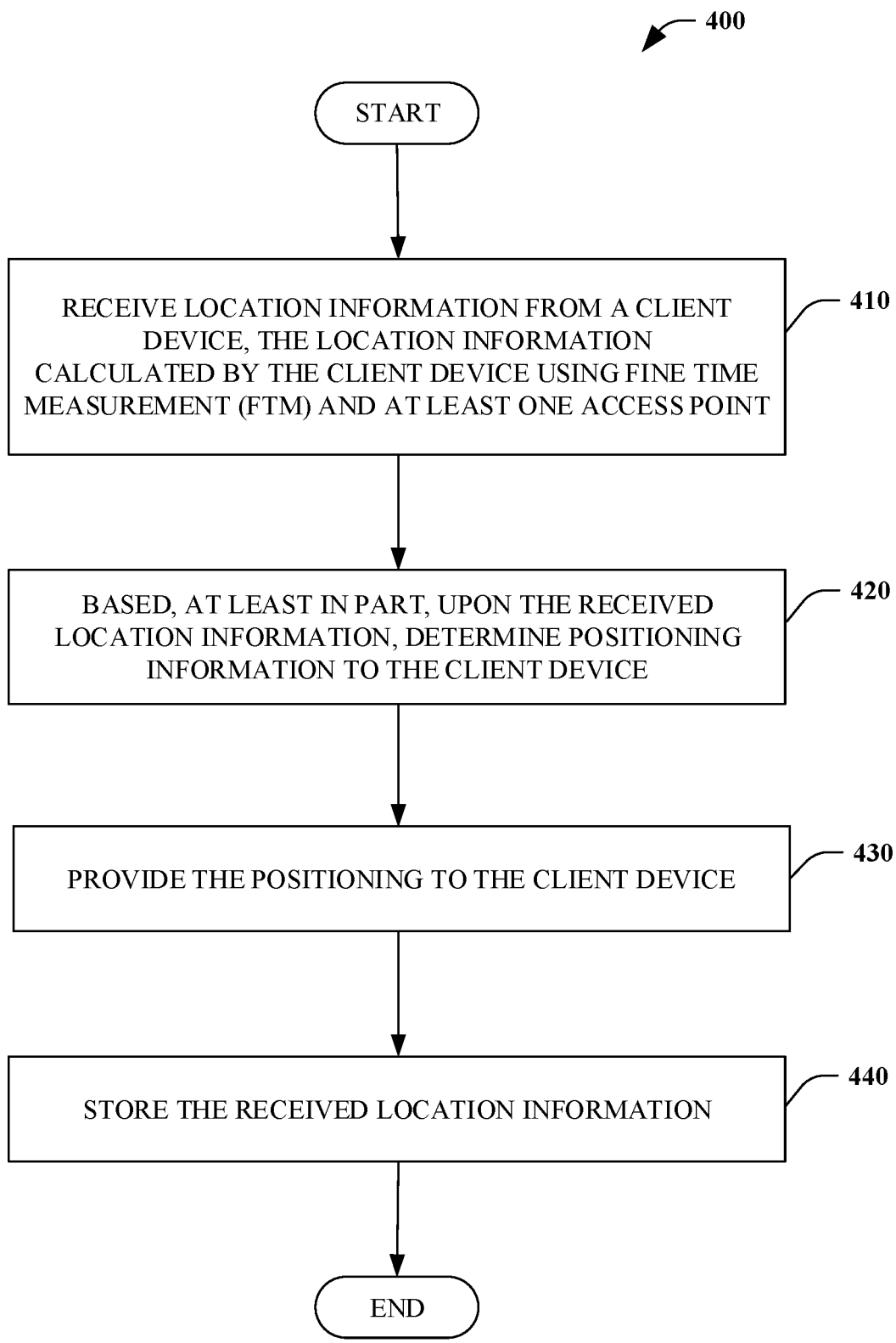
FIG. 4 is a flow chart of a method of providing positioning information.

Turning to FIG. 4, a method of providing positioning information 400 is illustrated. In some embodiments, the method 400 is performed by the geospatial service component 140.

At 410, location information is received from a client device. The location information is calculated by the client device using fine time measurement and at least one access points. At 420, positioning information is determined based, at least in part, upon the received location information. In some embodiments, the positioning information includes information regarding the physical environment (e.g., building, campus) of the client device (e.g., in proximity to the client device). At 430, the positioning information is provided to the client device. At 440, the received location information is stored.

Figure 5:
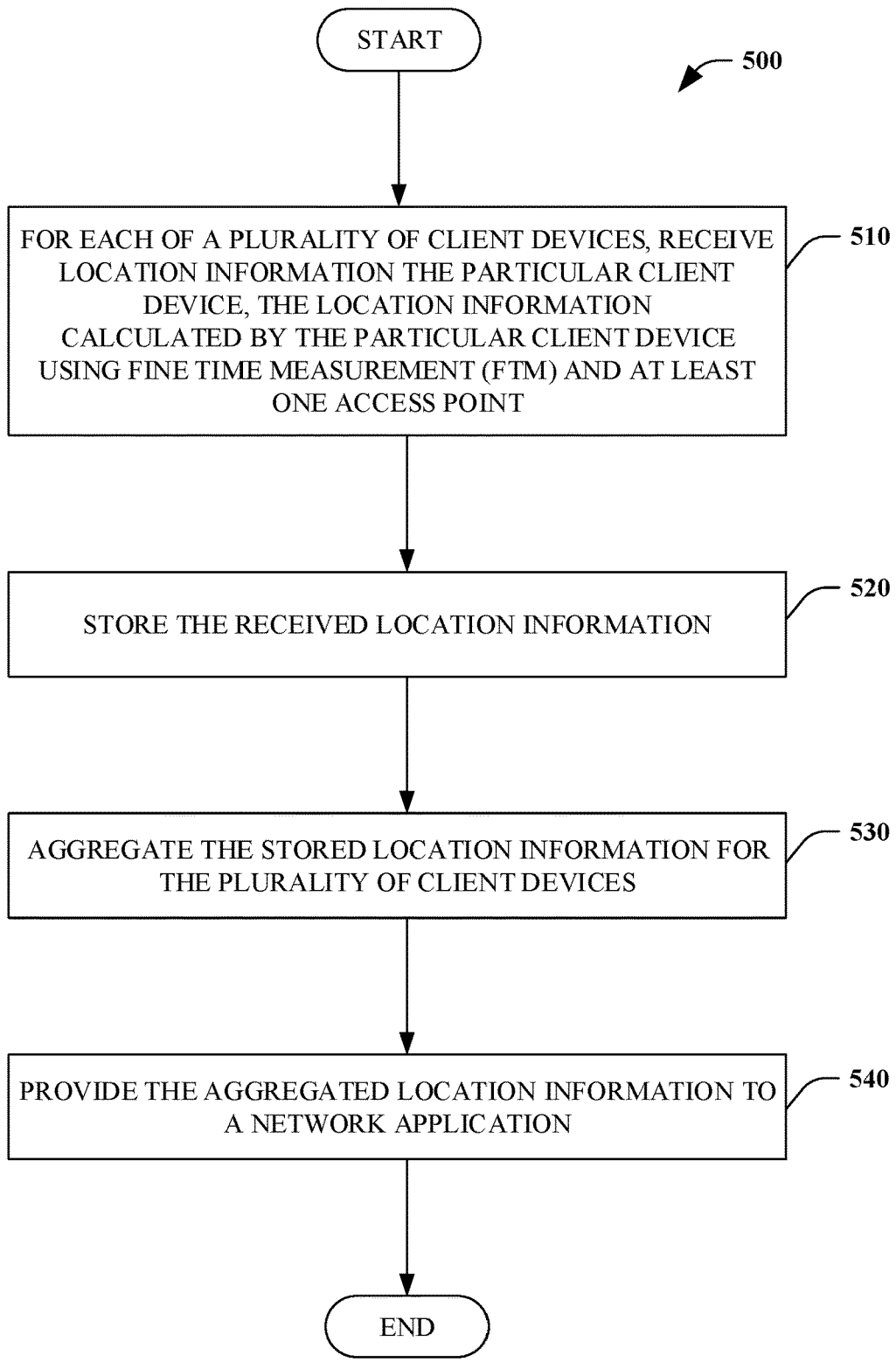
FIG. 5 is a flow chart of a method of providing positioning information.

Next, referring to FIG. 5, a method of providing positioning information 500 is illustrated. In some embodiments, the method 500 is performed by the geospatial service component 140.

At 510, for each of a plurality of client devices, location information is received for the particular client device. The location information is calculated by the particular client device using fine time measurement and at least one access point. In some embodiments, the location information is received for a particular period of time, for example, client devices currently connected to a geospatial service component. In some embodiments, the location information is received over a particular period of time, for example, client devices connected to the geospatial service component over the past hour, day, week, month etc.

At 520, the received location information is stored. At 530, the stored location information is aggregated for the plurality of client devices. At 540, the aggregated location information is provided to a network application.

Figure 6:
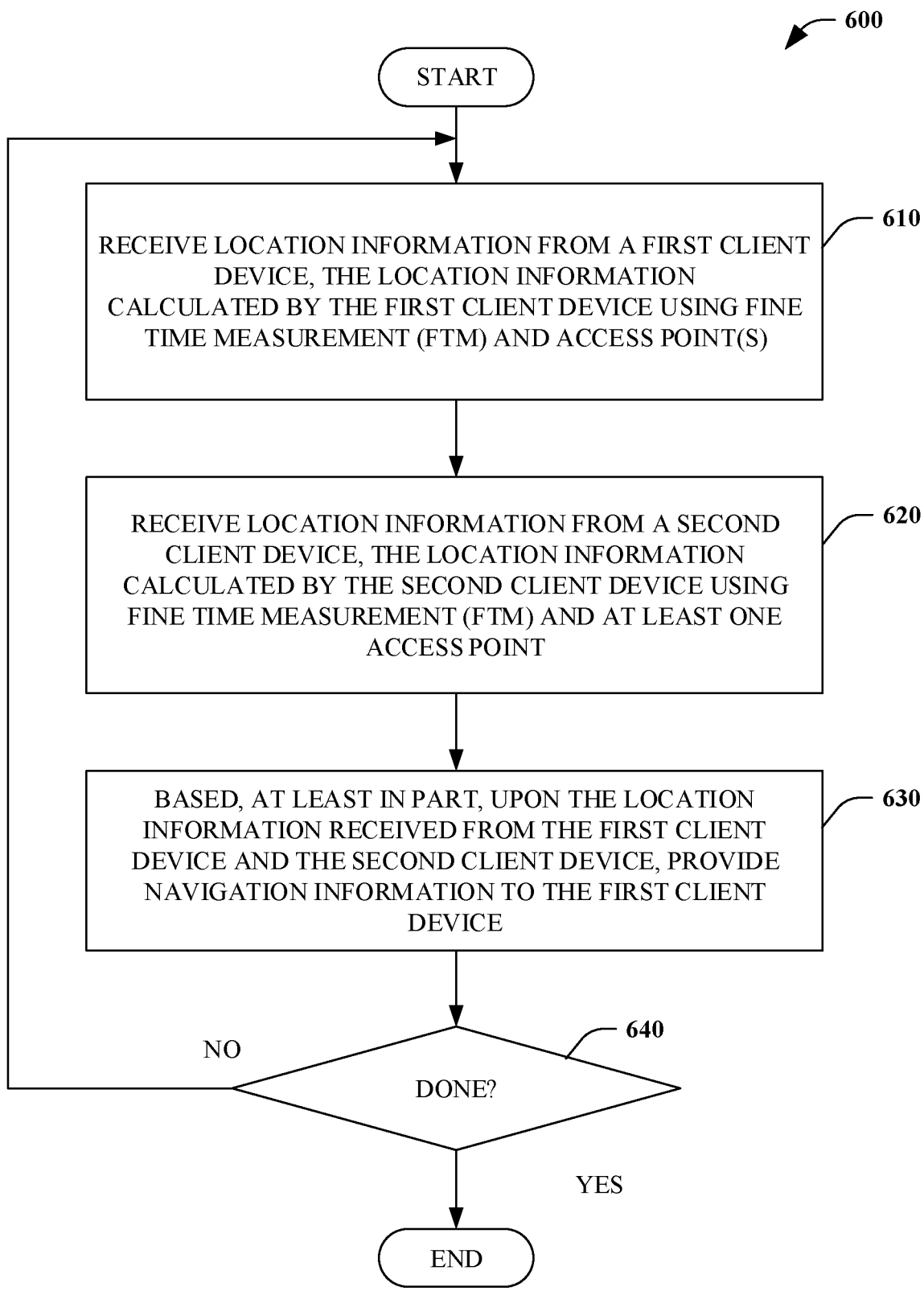
FIG. 6 is a flow chart of a method of providing positioning information.

Next, turning to FIG. 6, a method of providing positioning information 600 is illustrated. In some embodiments, the method 600 is performed by the geospatial service component 140.

At 610, location information is received from a first client device. The location information is calculated by the first client device using fine time measurement and access point(s). At 620, location information is received from a second client device. The location information is calculated by the second client device using fine time measurement and at least one access point.

At 630, navigation information is provided to the first client device based, at least in part, upon the location information received from the first client device and the second client device. At 640, a determination is made as to whether navigation is done. In some embodiments, the determination can be made implicitly based upon the location information received from the first client device and the second client device. For example, when the first client device and the second client device are within a threshold proximity of each other (e.g., within five feet), the determination can be implicitly made that navigation has been completed. In some embodiments, the determination can be made explicitly, for example, based upon user input to discontinue navigation.

If the determination at 640 is NO, processing continues at 610. If the determination at 640 is YES, no further processing occurs.

Described herein is a hybrid positioning model system, comprising: a computer comprising a processor and a memory having computer-executable instructions stored thereupon which, when executed by the processor, cause the computer to: receive location information from a client device, wherein the location information is calculated using fine time measurement (FTM) of IEEE 802.11mc and an access point; determine positioning information based, at least in part, upon the received location information; and provide the positioning information to the client device.

The system can further include wherein the location information is calculated without the client device being communicatively coupled to the access point. The system can further include wherein the location information is calculated using at least three access points. The system can further include wherein the positioning information is provided to the client device via at least one of a wired connection or a wireless connection and not via the access point.

The system can further include wherein the positioning information comprises information regarding a physical environment of the client device. The system can further include wherein the access point broadcasts information regarding a physical location of the access point. The system can further include wherein positioning information is determined by a geospatial service component physically separate from the client device.

The system can further include wherein positioning information is determined by a geospatial service component of the client device. The system can further include wherein positioning information is determined by a distributed geospatial service component with a portion on the client device and a portion remote from the client device.

Described herein is a method of providing positioning information, comprising: calculating location information of a client device using fine time measurement (FTM) and an access point; providing the calculated location information to a geospatial component; and receiving positioning information regarding a physical environment of the client device from the geospatial component.

The method can further include wherein the location information is calculated without the client device being communicatively coupled to the access point. The method can further include wherein the location information is calculated using at least three access points. The method can further include wherein the positioning information is provided to the client device via the access point.

The method can further include wherein the access point broadcasts information regarding a physical location of the particular access point. The method can further include wherein the positioning information comprises navigation information regarding a location of another user device relative to the client device.

Described herein is a computer storage media storing computer-readable instructions that when executed cause a computing device to: receive location information from a client device, wherein the location information is calculated by the client device using fine time measurement and an access point; determine positioning information based, at least in part, upon the received location information; and provide the positioning information to the client device.

The computer storage media can further include wherein the positioning information comprises information regarding a physical environment of the client device. The computer storage media can further include wherein the location information is calculated without the client device being communicatively coupled to the one access point.

The computer storage media can further include wherein the access point broadcasts information regarding a physical location of the access point. The computer storage media can store further computer-readable instructions that when executed cause a computing device to: store the received location information.

Figure 7:
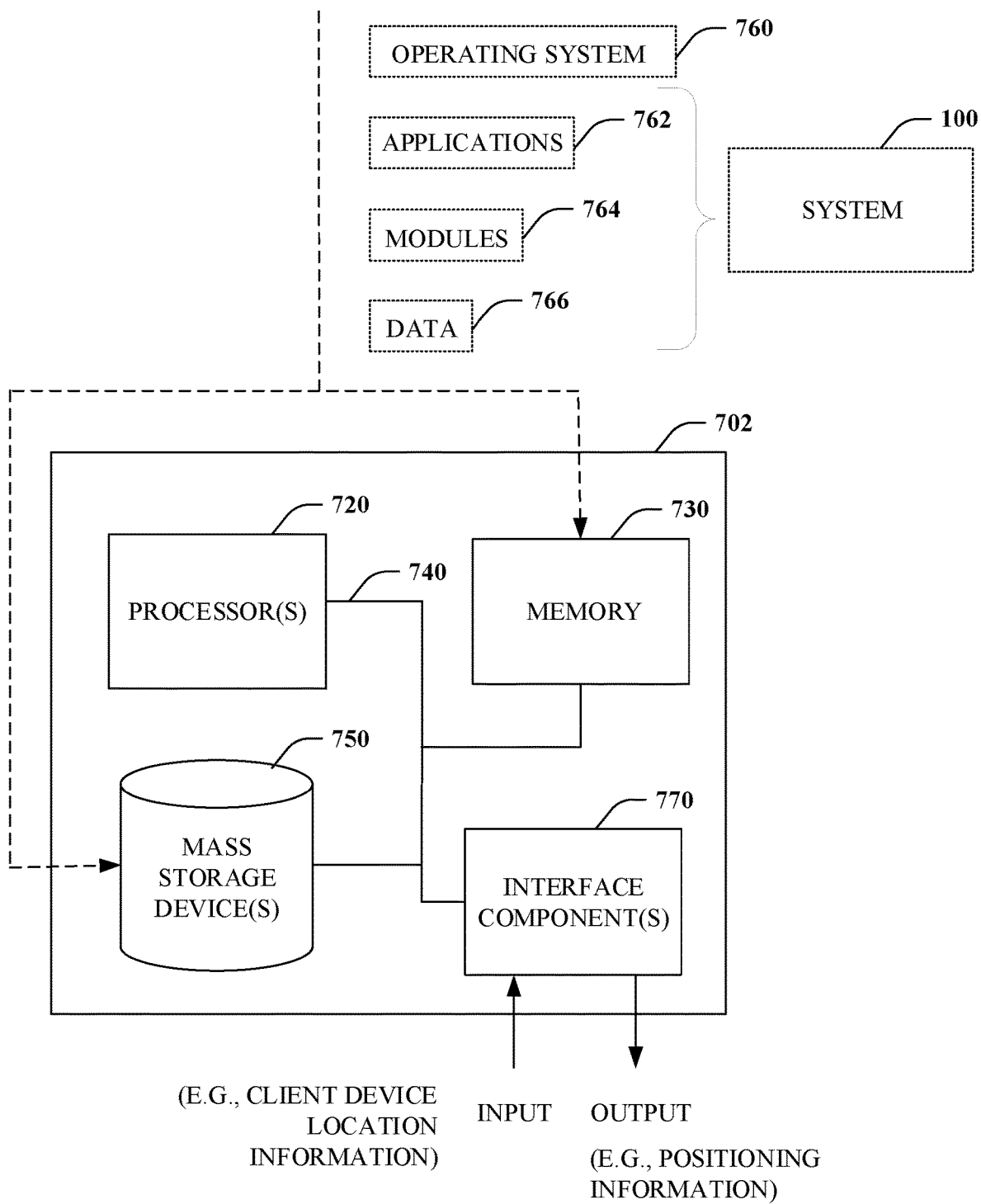
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a hybrid positioning model system 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A hybrid positioning model system, comprising:
   a computer comprising a processor and a memory having computer-executable instructions stored thereupon which, when executed by the processor, cause the computer to:
   receive location information from a client device, wherein the location information is calculated using fine time measurement (FTM) and an access point;

determine positioning information based, at least in part, upon the received location information, the positioning information specifying environment details of a physical environment of the client device;

provide the positioning information to the client device;

aggregate additional location information from one or more additional devices; and provide an indication when the aggregated additional location information reflects that a threshold number of devices are present in the physical environment.

2. The system of claim 1, wherein the location information is calculated without the client device being communicatively coupled to the access point.

3. The system of claim 1, wherein the location information is calculated using at least three access points.

4. The system of claim 1, wherein the positioning information is provided to the client device via at least one of a wired connection or a wireless connection and not via the access point.

5. The system of claim 1, wherein the access point broadcasts information regarding a physical location of the access point.

6. The system of claim 1, wherein positioning information is determined by a geospatial service component physically separate from the client device.

7. The system of claim 1, wherein positioning information is determined by a geospatial service component of the client device.

8. The system of claim 1, wherein positioning information is determined by a distributed geospatial service component with a portion on the client device and a portion remote from the client device.

9. A method of providing positioning information, comprising:

calculating location information of a client device using fine time measurement (FTM) and an access point;

providing the calculated location information to a geospatial component; and receiving positioning information regarding a physical environment of the client device from the geospatial component;

aggregating additional location information from one or more additional devices; and indicating when the aggregated additional location information reflects that a threshold number of devices are present in the physical environment.

10. The method of claim 9, wherein the location information is calculated without the client device being communicatively coupled to the access point.

11. The method of claim 9, wherein the location information is calculated using at least three access points.

12. The method of claim 9, wherein the positioning information is provided to the client device via the access point.

13. The method of claim 9, wherein the access point broadcasts information regarding a physical location of the access point.

14. The method of claim 9, wherein the positioning information comprises navigation information regarding a location of another user device relative to the client device.

15. A computer storage media storing computer-readable instructions that when executed cause a computing device to:

receive location information from a client device, wherein the location information is calculated by the client device using fine time measurement and an access point;

determine positioning information based, at least in part, upon the received location information, the positioning information specifying details of a physical environment of the client device; and provide the positioning information to the client device;

aggregate additional location information from one or more additional devices; and provide an indication when the aggregated additional location information reflects that a threshold number of devices are present in the physical environment.

16. The computer storage media of claim 15, wherein the location information is calculated without the client device being communicatively coupled to the access point.

17. The computer storage media of claim 15, wherein the access point broadcasts information regarding a physical location of the access point.

18. The computer storage media of claim 15 storing further computer-readable instructions that when executed cause a computing device to:

store the received location information.

19. The system of claim 1, further comprising computer-executable instructions that when executed by the processor cause a change in an environmental condition of the physical environment when the aggregated additional location information reflects that the threshold number of devices are present in the physical environment.

20. The system of claim 1, wherein the indication specifies a high volume of traffic or crowding in an area of the physical environment.

* * * * *